(12) United States Patent
Hwang et al.

(10) Patent No.: US 8,631,330 B1
(45) Date of Patent: Jan. 14, 2014

(54) SECURITY APPLICATION GRAPHICAL USER INTERFACE CUSTOMIZATION SYSTEMS AND METHODS

(75) Inventors: Vincent Hwang, Mountain View, CA (US); Dianne Pilon, San Jose, CA (US); Michael B. Roberts, San Francisco, CA (US); Iosefa M. C. Maierean, Sunnyvale, CA (US)

(73) Assignee: Bitdefender IPR Management Ltd., Nicosia (CY)

( * ) Notice: Subject to any disclaimer, the term of this patent is extended or adjusted under 35 U.S.C. 154(b) by 404 days.

(21) Appl. No.: 12/857,535

(22) Filed: Aug. 16, 2010

Related U.S. Application Data

(60) Provisional application No. 61/234,298, filed on Aug. 16, 2009.

(51) Int. Cl.
*G06F 3/0484* (2013.01)

(52) U.S. Cl.
USPC ........... 715/736; 715/707; 715/708; 715/762; 715/866; 726/22; 726/23; 726/24; 726/25

(58) Field of Classification Search
USPC ......... 715/744, 762, 765, 779, 794, 780, 807, 715/845
See application file for complete search history.

(56) References Cited

U.S. PATENT DOCUMENTS

| | | | | |
|---|---|---|---|---|
| 5,115,501 | A * | 5/1992 | Kerr ...................................... | 1/1 |
| 5,977,964 | A * | 11/1999 | Williams et al. ............... | 715/721 |
| 6,785,822 | B1 * | 8/2004 | Sadhwani-Tully ............. | 726/28 |
| 6,847,387 | B2 * | 1/2005 | Roth .............................. | 715/811 |
| 7,219,101 | B2 * | 5/2007 | Dorsey ................................. | 1/1 |
| 7,555,721 | B2 * | 6/2009 | Wassom et al. ............... | 715/745 |
| 7,620,894 | B1 * | 11/2009 | Kahn .............................. | 715/707 |
| 7,634,567 | B1 * | 12/2009 | Wood et al. .................... | 709/226 |
| 7,680,901 | B2 * | 3/2010 | Rechterman et al. ......... | 709/219 |
| 7,802,197 | B2 * | 9/2010 | Lew et al. ...................... | 715/789 |
| 7,840,600 | B1 * | 11/2010 | Bhatia ............................ | 707/793 |
| 8,082,330 | B1 * | 12/2011 | Castelli et al. ................ | 709/220 |
| 8,209,638 | B2 * | 6/2012 | Hoff et al. ...................... | 715/866 |
| 8,209,758 | B1 * | 6/2012 | Doukhvalov et al. ........... | 726/24 |
| 2003/0088793 | A1 * | 5/2003 | Parry ............................. | 713/202 |

(Continued)

OTHER PUBLICATIONS

Bitdefender, "BitDefender 2008 User Guide", available at <http://download.bitdefender.com/windows/desktop/total_security/final/en/BitDefender_TS_2008_Userguide_en.pdf>, released on Apr. 10, 2008, 281 pages.*

(Continued)

*Primary Examiner* — William Bashore
*Assistant Examiner* — Reza Nabi
(74) *Attorney, Agent, or Firm* — Law Office of Anderi D Popovici, PC

(57) ABSTRACT

In some embodiments, a graphical user interface (GUI) of a computer security application is automatically configured according to a user profile of the user. Upon installation of the computer security application, a desired GUI complexity questionnaire is displayed to the user. The application then matches the user to a user profile out of a set of predefined user profiles, according to the user's answers to the questionnaire. User profiles reflect a user's desired complexity of display and control (e.g. Novice/Intermediate/Expert, Basic/Intermediate/Advanced). The information displayed and application controls provided by the GUI window vary in detail according to the user profile. Selecting a user profile propagates multiple individually-user-configurable display and control settings of the GUI, as well as under-the-hood (non-GUI) settings of the anti-malware application.

16 Claims, 15 Drawing Sheets

(56) References Cited

U.S. PATENT DOCUMENTS

| | | | |
|---|---|---|---|
| 2008/0148150 A1* | 6/2008 | Mall ............................ | 715/707 |
| 2008/0184146 A1* | 7/2008 | Kimball et al. ............... | 715/765 |
| 2008/0244691 A1* | 10/2008 | Hilerio et al. ..................... | 726/1 |
| 2008/0263462 A1* | 10/2008 | Mayer-Ullmann et al. ... | 715/762 |
| 2009/0125896 A1* | 5/2009 | Chessell et al. ............... | 717/168 |
| 2009/0138691 A1* | 5/2009 | Peterson ........................... | 713/1 |
| 2009/0282476 A1* | 11/2009 | Nachenberg et al. ........... | 726/22 |
| 2009/0300060 A1* | 12/2009 | Beringer et al. ......... | 707/103 R |
| 2009/0311657 A1* | 12/2009 | Dodelson et al. ............. | 434/350 |
| 2009/0327168 A1* | 12/2009 | Weinberger et al. ............ | 706/11 |
| 2009/0327958 A1* | 12/2009 | Lung ............................ | 715/810 |
| 2010/0058333 A1* | 3/2010 | Peterson ....................... | 717/178 |

OTHER PUBLICATIONS

Bitdefender, "BitDefender 2009 User Guide", available at <http://download.bitdefender.com/windows/desktop/total_security/final/en/BitDefender_TSOB_2009_Userguide_en.pdf>, released on Nov. 3, 2008, 454 pages.*

Bitdefender, "BitDefender 2010 User Guide", available at <http://download.bitdefender.com/windows/desktop/total_security/final/en/BitDefender_TSOB_2010_Userguide_en.pdf>, released on Aug. 3, 2009, 444 pages.*

Mccafee, "Mccafee Family Protection 2009 User Guide", available at <http://download.mcafee.com/products/manuals/en-us/MFPO_userguide_2009.pdf>, released Jun. 2009, 10 pages.*

Bitdefender, "BitDefender Total Security 2008 User Guide," pp. 1-281, BitDefender, Bucharest, Romania, document dated Apr. 10, 2008, available for download at http://download.bitdefender.com/windows/desktop/total_security/final/en/BitDefender_TS_2008_Userguide_en.pdf.

Bitdefender, "BitDefender Internet Security 2009 User's Guide," pp. 1-319, BitDefender, Bucharest, Romania, document dated Oct. 29, 2008, available for download at http://download.bitdefender.com/windows/desktop/internet_security/final/en/BitDefender_IS_2009_Userguide_en.pdf.

Bitdefender, "BitDefender Total Security 2010 User's Guide," pp. 1-427, BitDefender, Bucharest, Romania, document dated Apr. 7, 2010, available for download at http://download.bitdefender.com/resources/media/ materials/2010/en/ts/userguide.pdf.

* cited by examiner

| User profile | Most frequent uses for PC | Desired level of information | Desired level of customization | Online content filtering | ... |
|---|---|---|---|---|---|
| Typical | www, music, document proc. | Medium | Low | No | |
| Parent | www, music, online games | Low | Low | Yes | |
| Gamer | www, online games | Low | Low | No | |
| Custom | www, music, document proc. | High | High | Maybe | |
| Novice | www, music, document proc. | Low | Low | Maybe | |
| Intermediate | www, music, document proc. | Medium | Medium | Maybe | |
| Expert | www, music, document proc. | High | High | No | |

FIG. 4

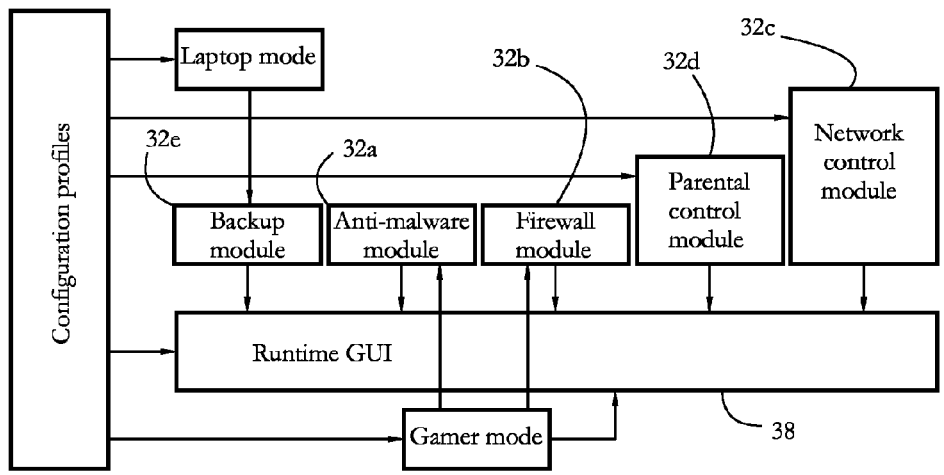

FIG. 5

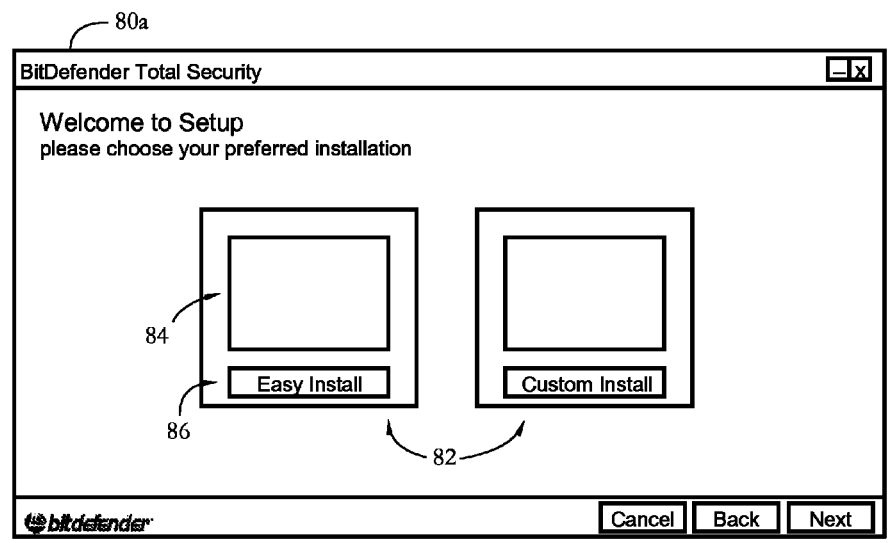
FIG. 7-A
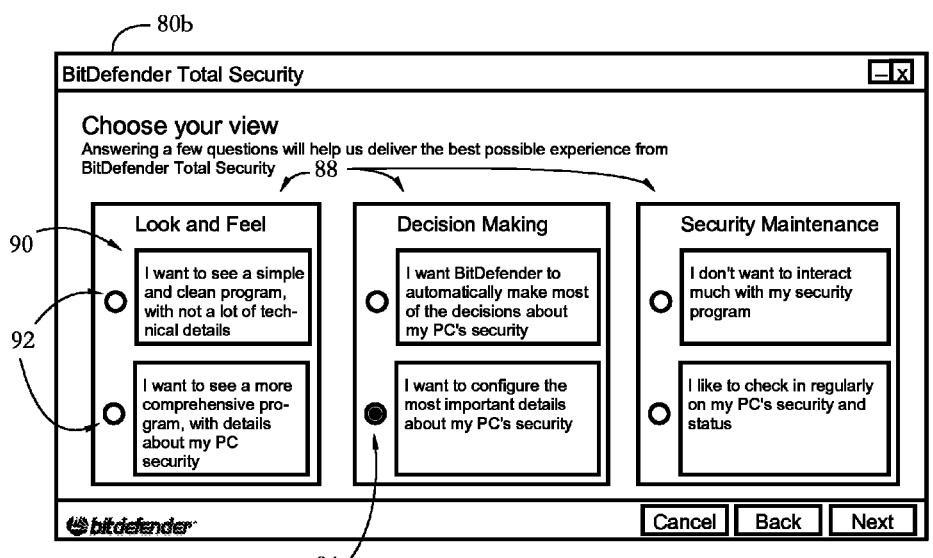
FIG. 7-B

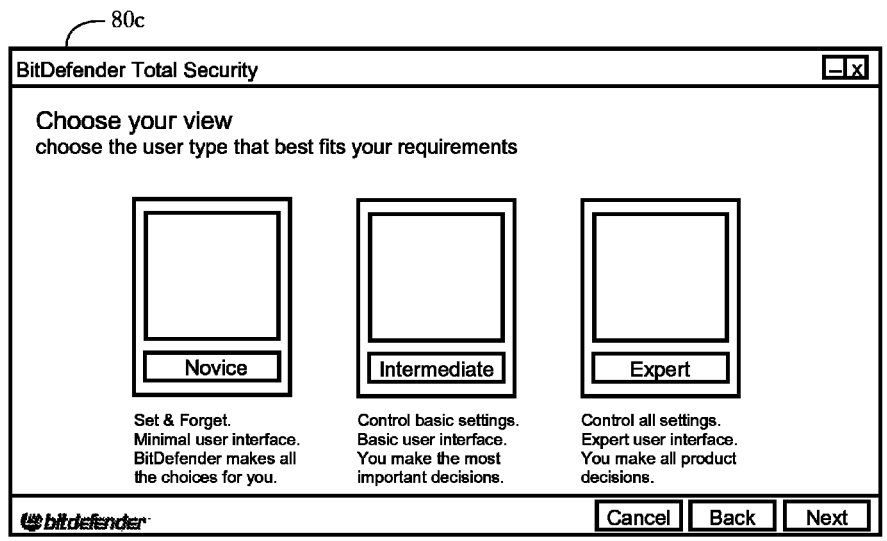
FIG. 7-C
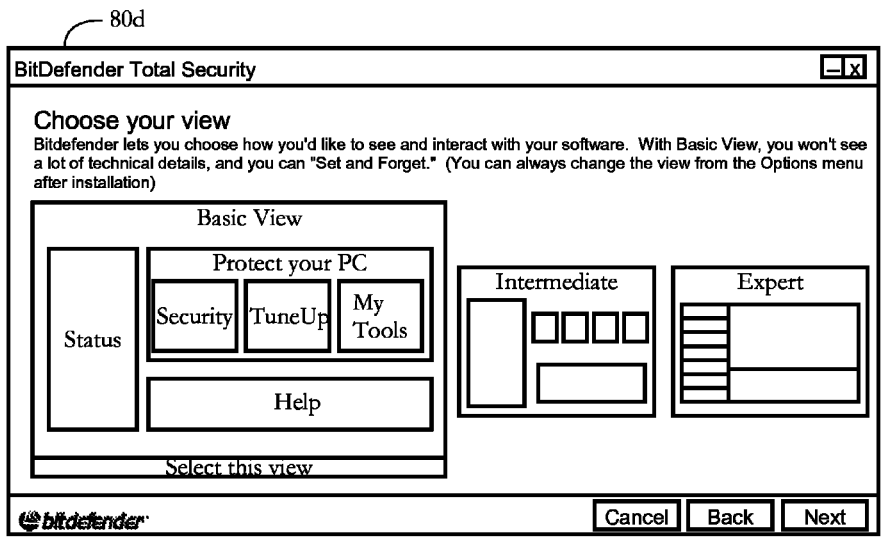
FIG. 7-D

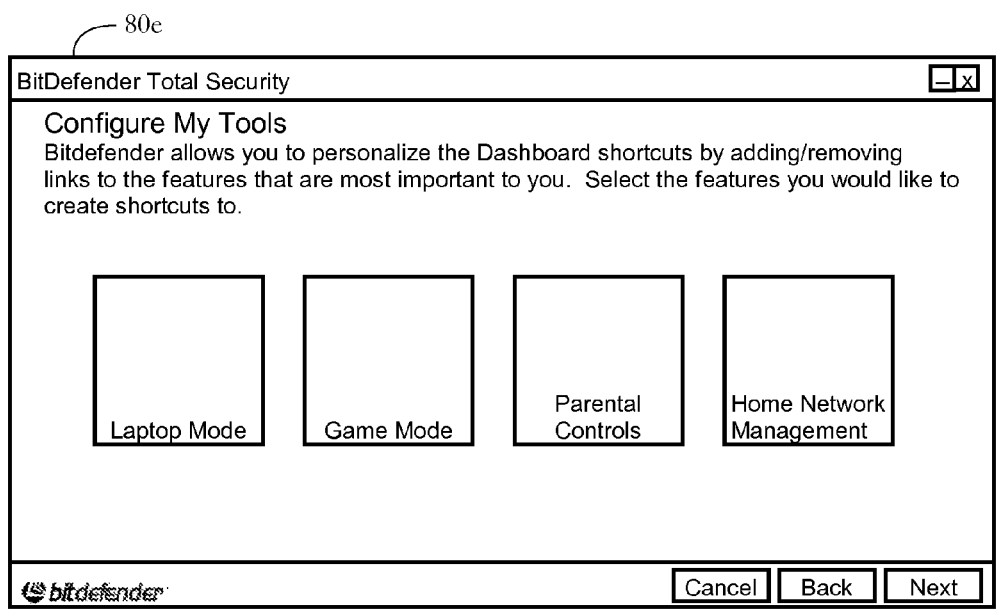
FIG. 9-A

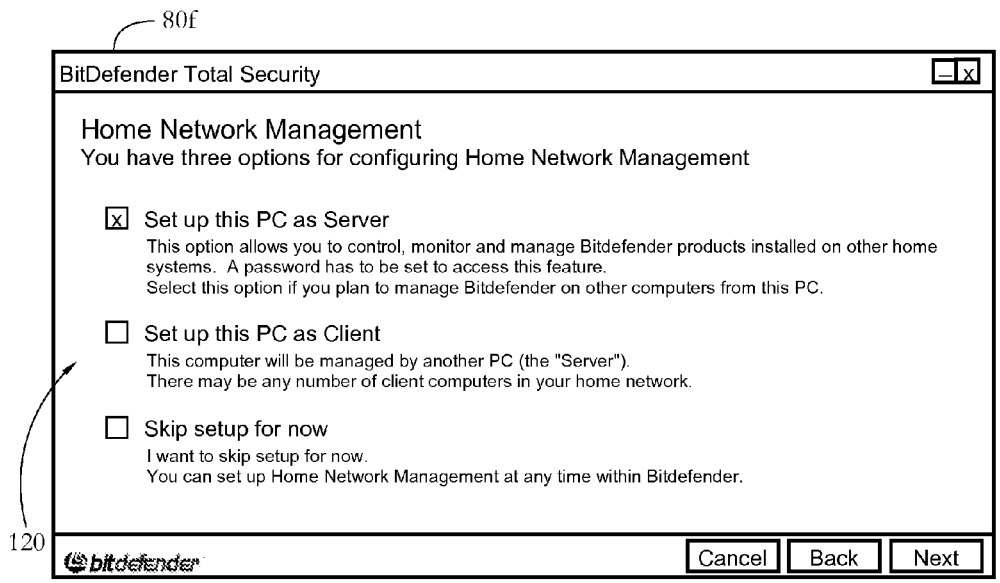
FIG. 9-B
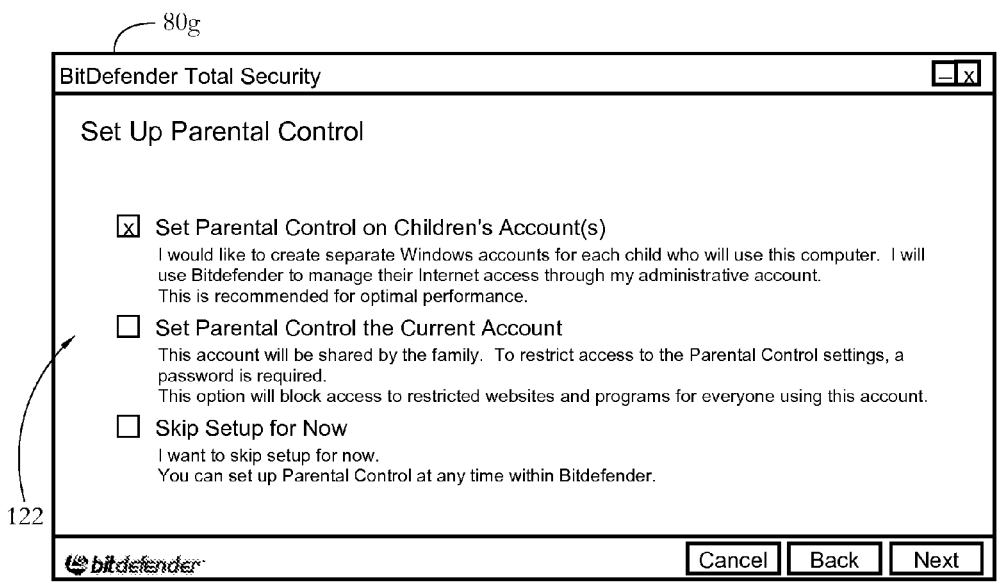
FIG. 9-C

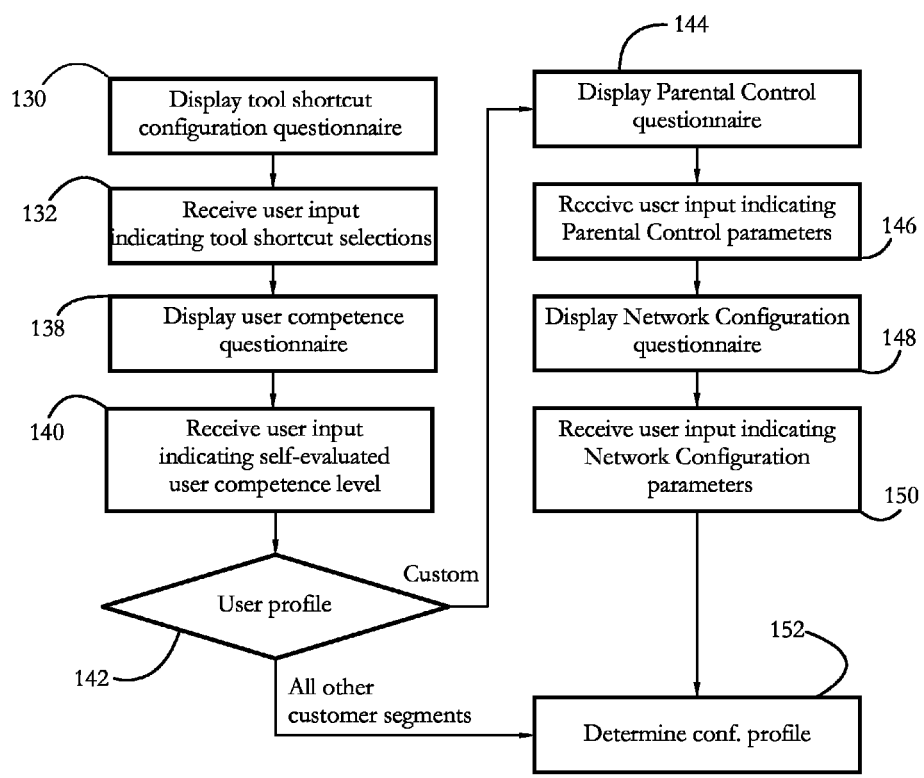
FIG. 10-A

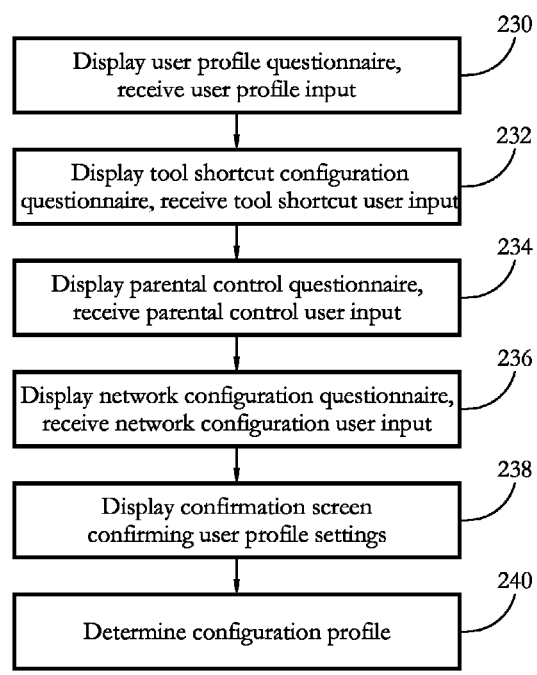
FIG. 10-B

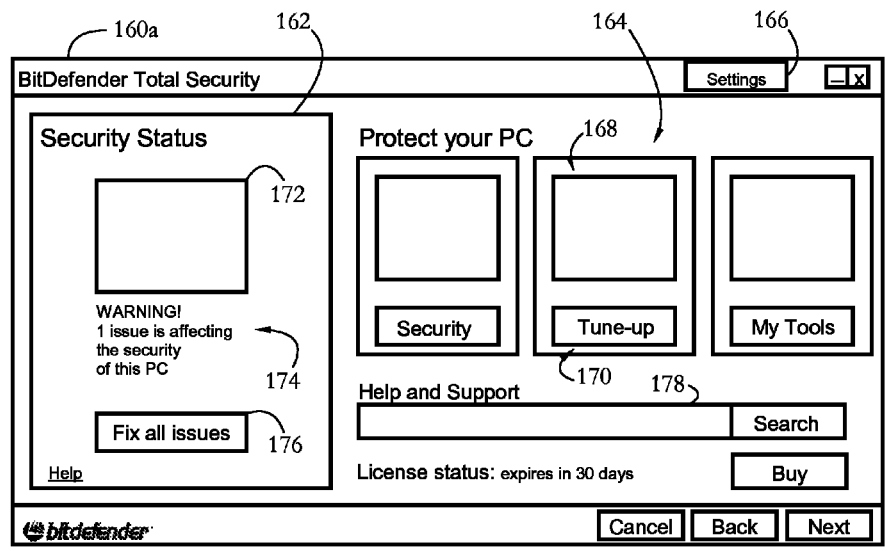
FIG. 11-A
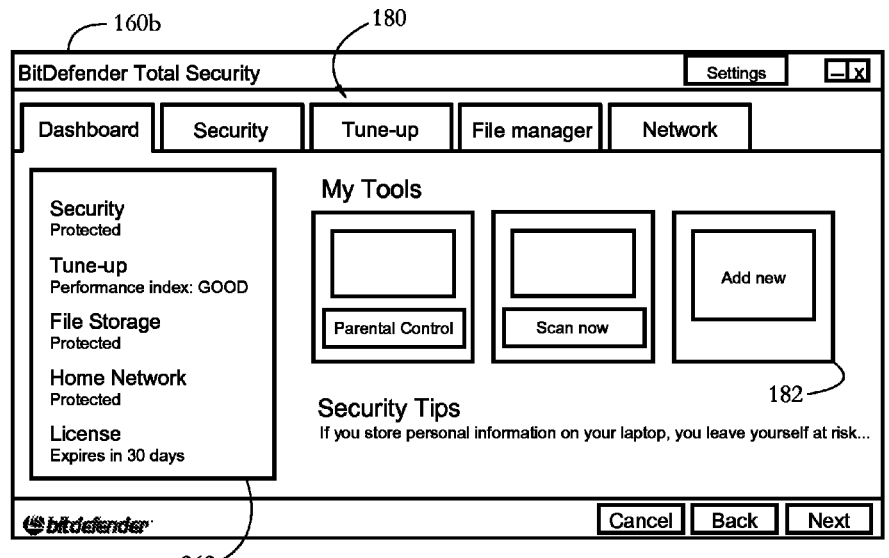
FIG. 11-B

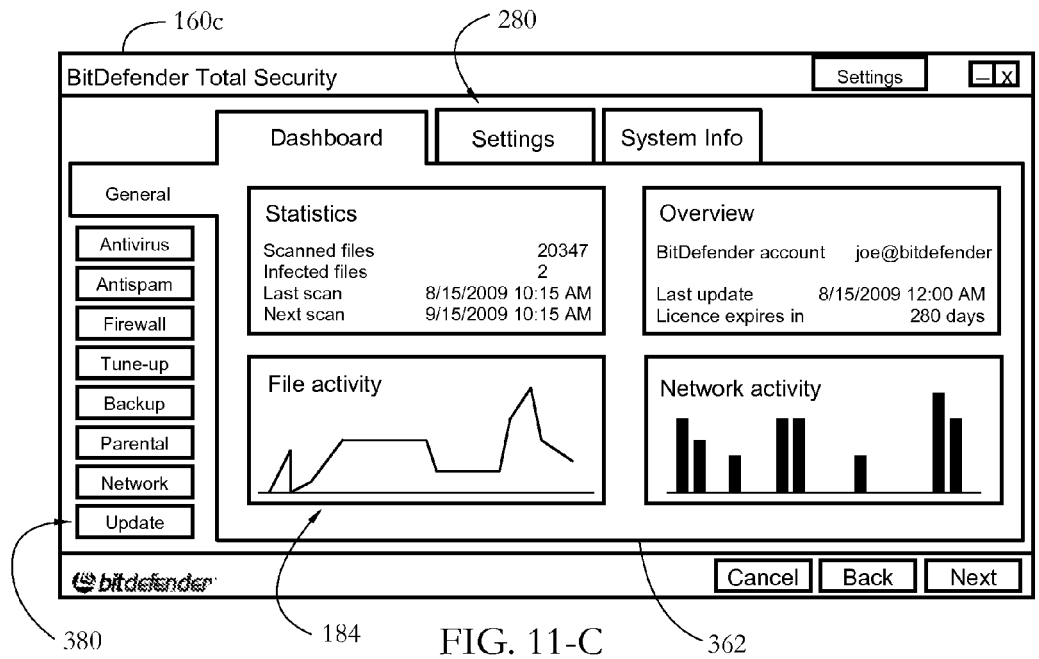
FIG. 11-C
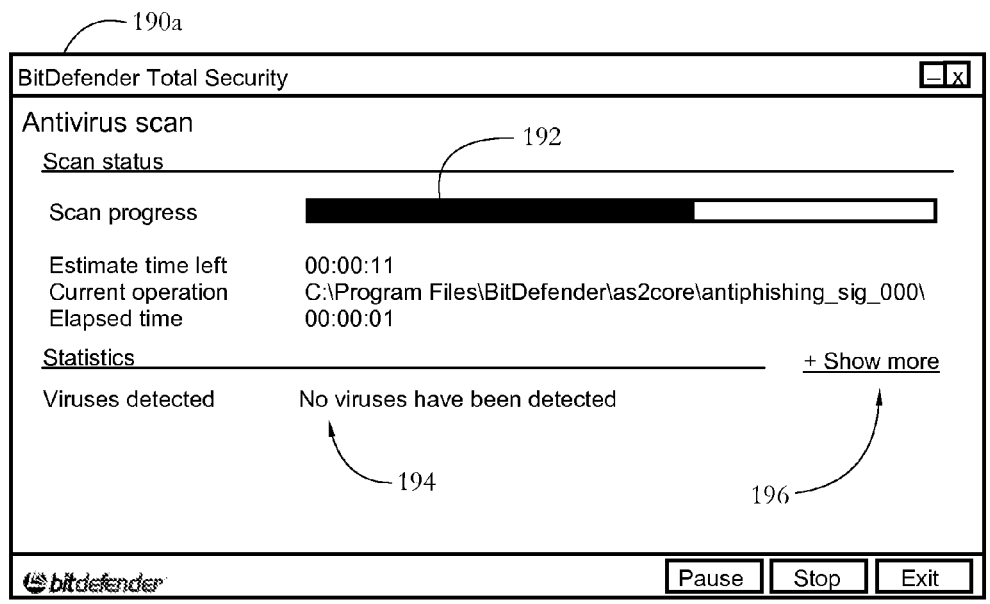
FIG. 12-A

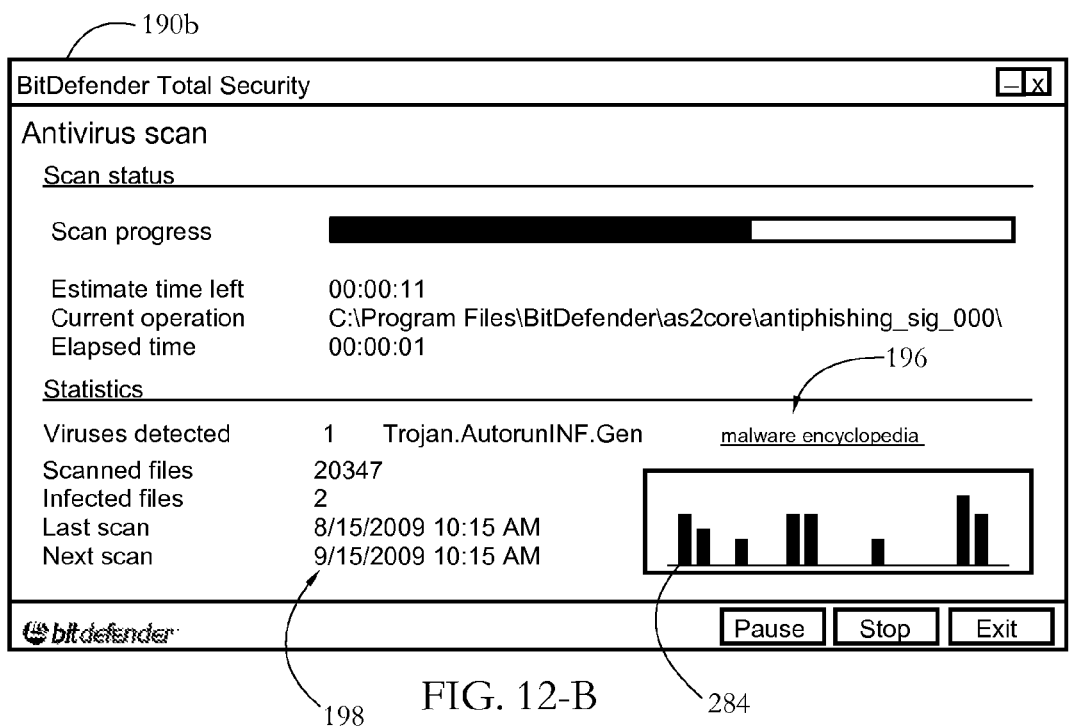
FIG. 12-B

US 8,631,330 B1

SECURITY APPLICATION GRAPHICAL USER INTERFACE CUSTOMIZATION SYSTEMS AND METHODS

RELATED APPLICATION DATA

This application claims the benefit of the filing date of U.S. Provisional Patent Application No. 61/234,298, titled "User Profile Systems and Methods", filed Aug. 16, 2009, herein incorporated by reference.

BACKGROUND

The invention relates to graphical user interfaces, and in particular, to systems and methods for configuring a graphical user interface for a computer security application.

Computer security threats affect a great number of computer systems worldwide. Taking many forms, from malicious software (viruses, Trojans), to intrusion (hacking, keylogging) and spam, among others, such threats have the potential to make millions of computer users worldwide vulnerable to loss of data, identity theft, and loss of productivity.

Various software solutions have been designed to counter such security threats. In some cases, security software is bundled with other computer programs in larger software packages which may include, for instance, system maintenance (e.g. backup, disk defragmentation, data compression), encryption of data and/or communication, and parental control over the access to the Internet, among others. As the complexity of such software packages increases, software developers are facing new challenges to delivering products that are user-friendly and at the same time address the needs of a broad variety of users.

SUMMARY

According to one aspect, a computer-implemented method comprises employing a computer system including at least one processor to perform: an anti-malware application customization sequence comprising displaying to a user a desired graphical user interface content complexity questionnaire, the desired graphical user interface content complexity questionnaire inviting the user to select a desired anti-malware application graphical user interface content display complexity from a plurality of content complexity levels, the complexity levels including a low complexity, an intermediate complexity, and a high complexity level; and in response to displaying the desired graphical user interface complexity questionnaire, receive a user input indicative of the desired anti-malware application graphical user interface display complexity; and a display of an anti-malware application graphical user interface (GUI) configured according to the user input indicative of the desired anti-malware application graphical user interface display complexity. For the low complexity level, the GUI generates an application home display comprising a plurality of common user task control items, each common user task control item being configured to receive a user input initiating a common anti-malware application task. For at least one level selected from the intermediate complexity and high complexity levels, the GUI generates an application display home including a plurality of functional area tabs, each functional area tab being configured to receive a user input initiating a display of a dashboard for a corresponding functional area of the anti-malware application.

According to another aspect, a computer system comprises a memory storing instructions which, when executed, cause the computer system to form: an anti-malware application profile manager and an anti-malware application graphical user interface (GUI) connected to the profile manager. The profile manager displays a desired graphical user interface complexity questionnaire to a user upon a first use of an anti-malware application on the computer system, and in response to displaying the questionnaire, receives a user input indicative of a desired graphical user interface complexity level. The anti-malware application graphical user interface (GUI) selects according to the desired graphical user interface complexity level a set of display items exposed by the GUI to users of the anti-malware application.

BRIEF DESCRIPTION OF THE DRAWINGS

The foregoing aspects and advantages of the present invention will become better understood upon reading the following detailed description and upon reference to the drawings where:

FIG. 4 illustrates a plurality of user profiles according to some embodiments of the present invention.

FIG. 5 shows an exemplary network of relations between configuration profiles and software components of the computer security application of FIG. 3, according to some embodiments of the present invention.

FIG. 7-A shows an exemplary setup GUI window displaying an install setup questionnaire requesting a user to select one of a standard (easy) and custom (advanced) installation process for a computer security application, according to some embodiments of the present invention.

FIG. 7-B shows an exemplary setup GUI window displaying a questionnaire requesting a user to select an option for each of a look-and-feel, decision-making, and security maintenance GUI area of a computer security application, according to some embodiments of the present invention.

FIG. 7-C shows an exemplary set GUI window displaying a view selection questionnaire requesting a user to select one of a novice (basic), intermediate (medium), and expert (advanced) GUI configuration, according to some embodiments of the present invention.

FIG. 7-D shows another exemplary set GUI window displaying a view selection questionnaire requesting a user to select one of a novice (basic), intermediate (medium), and expert (advanced) GUI configuration, according to some embodiments of the present invention.

FIG. 9-A shows an exemplary setup GUI window including a security application tool configuration questionnaire according to some embodiments of the present invention.

FIG. 9-B shows an exemplary setup GUI window including a home network management questionnaire according to some embodiments of the present invention.

FIG. 9-C shows an exemplary setup GUI window including a parental control setup questionnaire according to some embodiments of the present invention.

FIG. 10-A shows an exemplary sequence of steps performed by a profile manager to process a multi-part setup questionnaire, according to some embodiments of the present invention.

FIG. 10-B shows another exemplary sequence of steps performed by a profile manager to process a multi-part setup questionnaire, according to some embodiments of the present invention.

FIG. 11-A shows an exemplary GUI window configured for a Novice user, according to some embodiments of the present invention.

FIG. 11-B shows an exemplary GUI window configured for an Intermediate user, according to some embodiments of the present invention.

FIG. 11-C shows an exemplary GUI window configured for an Expert user, according to some embodiments of the present invention.

FIG. 12-A shows an exemplary GUI window of an anti-malware module, the window configured for a Novice or Intermediate user, according to some embodiments of the present invention.

FIG. 12-B shows an exemplary GUI window of an anti-malware module, the window configured for an Expert user, according to some embodiments of the present invention.

DETAILED DESCRIPTION OF PREFERRED EMBODIMENTS

Figure 1:
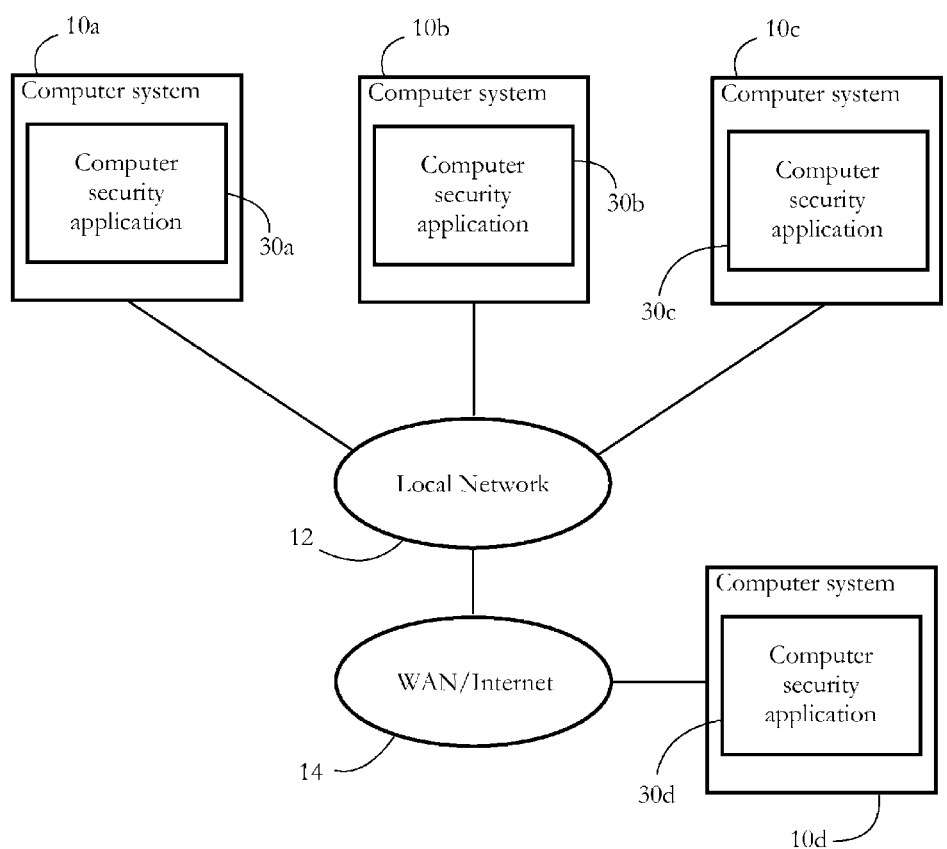
FIG. 1 shows a plurality of computer systems, each running a computer security application according to some embodiments of the present invention.

Systems and methods described herein may include or employ computer systems including one or more interconnected computers including one or more processors and associated memory, storage, input and display devices. Such computer systems may run software implementing methods described herein. Such software may be provided as part of or in conjunction with personal computer security software such as antivirus software or a security software suite. In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A granularity of a set of items is understood to represent a scale or level of detail present in the set of items. Coarse and fine, and high and low are understood to be relative terms. For example, a recited coarse granularity is understood to comprise fewer details than a fine granularity. A configuration profile as described below may be represented/implemented as a data structure (e.g. vector) defining multiple security and/or other software functions, each configurable individually by a user through a user interface. A configuration profile includes some or all user-settable setting states used by software functions. Computer malware comprises viruses, worms, Trojans, rootkits, and spyware, among others. Computer programs described in some embodiments of the present invention may be stand-alone software entities or sub-entities (e.g., subroutines, code objects) of other computer programs. Computer readable media encompass storage media such as magnetic, optic, and semiconductor media (e.g. hard drives, optical disks, flash memory, DRAM), as well as communications links such as conductive cables and fiber optic links. Unless otherwise specified, display/GUI complexity is measured according to the level of granularity/detail of the information content and control capability provided by the display/GUI. Unless otherwise specified, GUI content refers to the informational content displayed by the GUI, rather than the purely aesthetic/graphical elements of the GUI. According to some embodiments, the present invention provides, inter alia, computer systems programmed to perform the methods described herein, as well as computer-readable media encoding instructions to perform the methods described herein.

The following description illustrates embodiments of the invention by way of example and not necessarily by way of limitation.

FIG. 1 shows an exemplary computing environment including a set of computer systems 10a-d configured to perform computer security tasks according to some embodiments of the present invention. A subset of systems 10a-d, such as systems 10a-c in FIG. 1, are interconnected through a local area network 12. Local area network 12 includes inter-computer interconnections through OSI layer 2 devices such as switches. For instance, systems 10a-c may be personal computers of a household, and local area network 12 may be a home network. In a corporate example, systems 10a-c may be computers belonging to a company (office), and network 12 may include a corporate local area network (LAN). Systems forming part of local network 12 may be further connected to a wide-area network (WAN) 14 through OSI layer 3 devices such as routers. In some embodiments, WAN 14 may be the Internet. Other exemplary computing systems, such as system 10d in FIG. 1, may be connected directly to WAN 14.

Each of systems 10a-d is configured to execute a computer security application 30a-d, respectively. Applications 30a-d may be distinct computer programs or instances of the same computer program. In some embodiments, each application 30a-d is configured to perform a set of operations relating to computer security, such as malware detection, spam detection, and intrusion prevention, among others. Applications 30a-d may be stand-alone software entities or sub-entities (e.g., subroutines, code objects) of other computer programs. For instance, applications 30a-b may be incorporated into larger software packages (suites). Each application 30a-d may be individually configurable according to details of the respective computer system, and according to user preferences as described in detail below.

In some embodiments, a subset of computer systems 10a-d may be configured as servers, performing computer security operations on behalf or at the request of other computer systems. For instance, system 10a may be set up as a security server, performing malware detection for systems 10b-c, which may be configured as clients. In such a case, system 10a may receive data (e.g. files to be scanned for malware) from systems 10b-c and may send data (e.g. scan reports) back to systems 10b-c over networks 12, 14.

Figure 2:
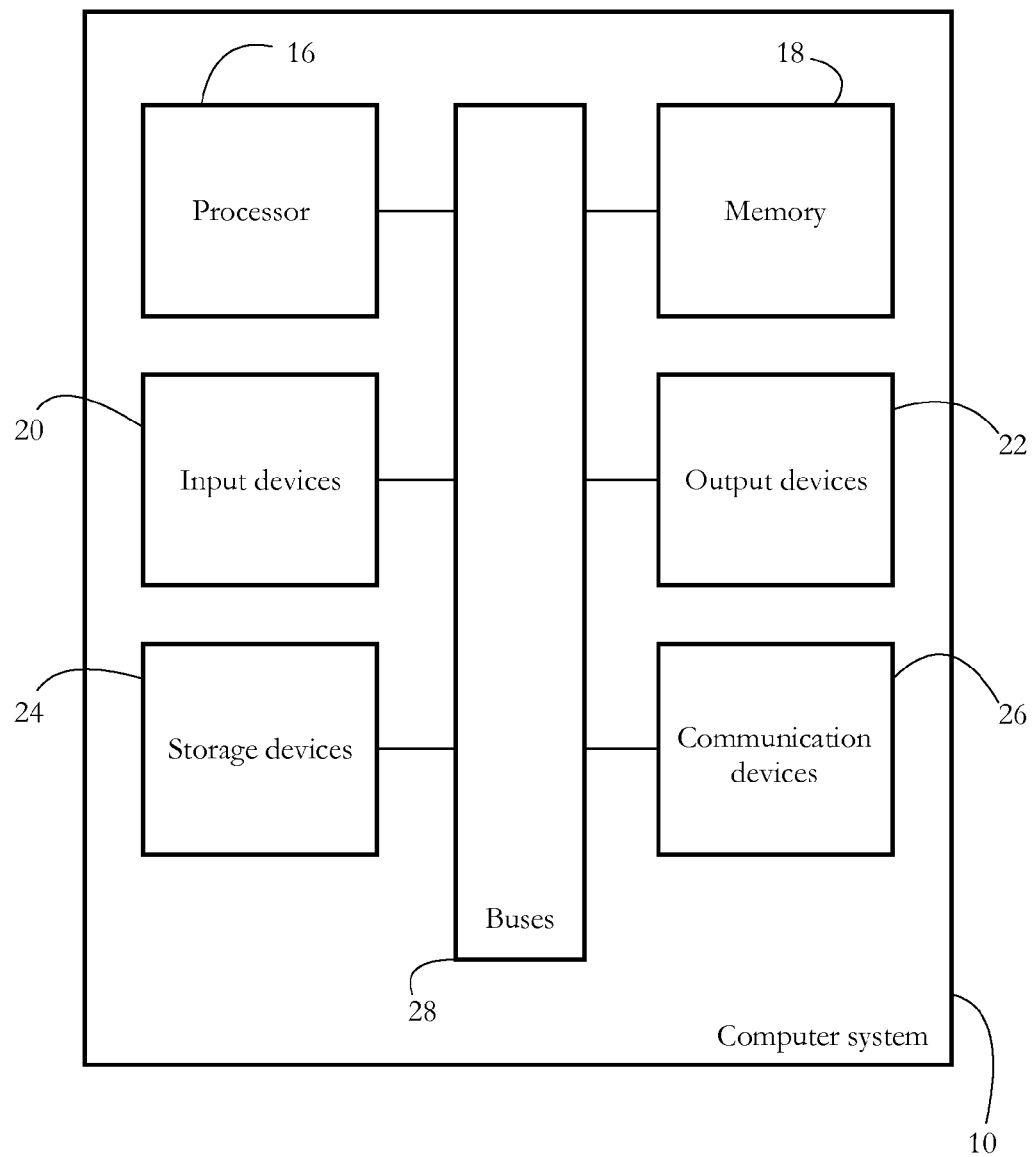
FIG. 2 shows an exemplary computer system configured to execute security software instructions according to some embodiments of the present invention.

Software instructions implementing computer security applications 30a-d are executed by the hardware of computer systems 10a-d. An exemplary configuration of a computer system 10 is shown in FIG. 2. In some embodiments, system 10 comprises a processor 16, a random access memory 18, a set of input devices 20, a set of output devices 22, a set of storage devices 24, and a set of communication devices 26, all connected by a set of buses 28.

In some embodiments, processor 16 comprises a physical device (e.g. multi-core integrated circuit) configured to execute computational and/or logical operations with a set of signals and/or data. In some embodiments, such logical operations are delivered to processor 16 in the form of a sequence of instructions (e.g. machine code or other type of software). Memory 18 stores instructions and data accessed or generated by processor 16. Input devices 20 may include computer keyboards, mice, and touch-screen displays among others, allowing a user to introduce data and/or instructions into system 10. Output devices 22 may include display devices such as monitors. Storage devices 24 include computer-readable media enabling the non-volatile storage, reading, and writing of software instructions and/or data. Exemplary storage devices 24 include magnetic and optical disks and flash memory devices, as well as removable media such as CD and/or DVD disks and drives. Communication devices 26 enable computer system 10 to connect to a computer network and/or to other physical machines/computer systems. Typical communication devices 26 include network adapters. Buses 28 collectively represent the plurality of system, peripheral, and chipset buses, and/or all other circuitry enabling the inter-communication of devices 16-26 of system 10. For example, buses 28 may comprise the northbridge bus connecting processor 16 to memory 18, and/or the southbridge bus connecting processor 16 to devices 20-26, among others.

Figure 3:
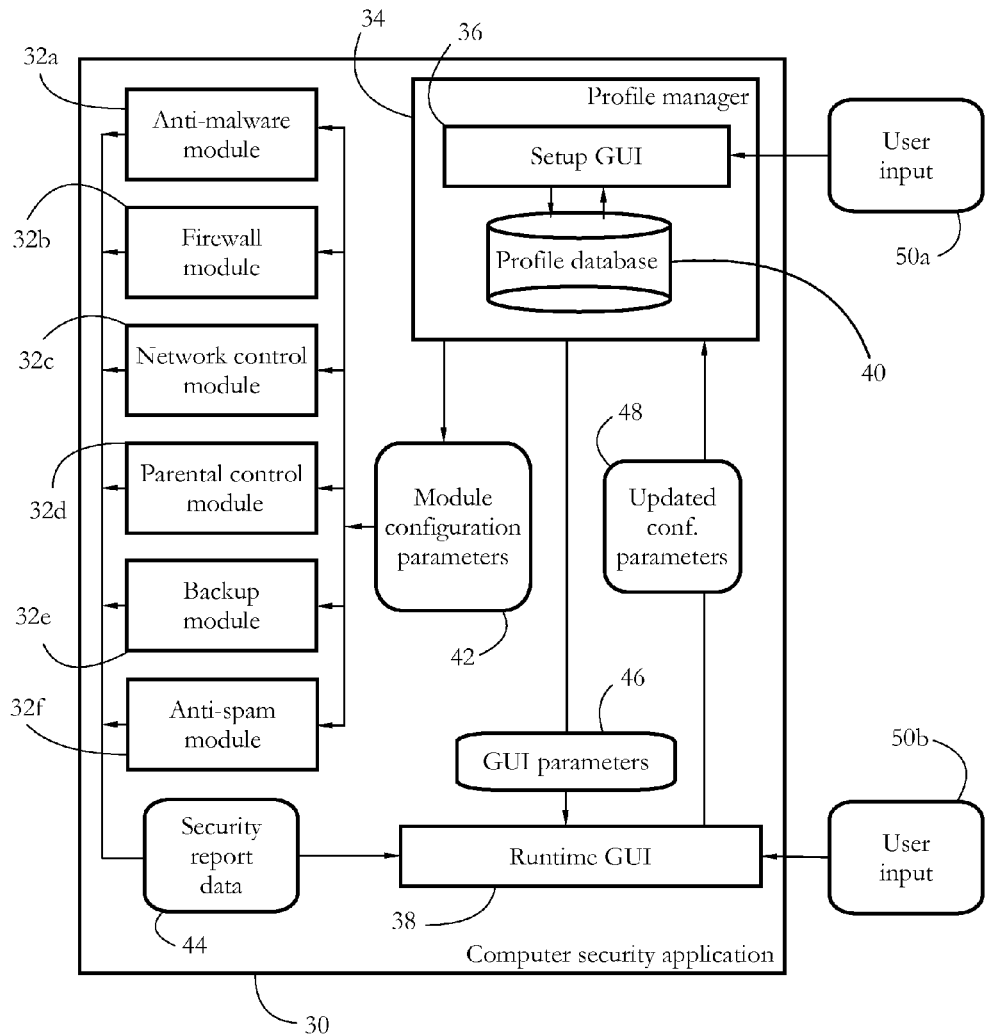
FIG. 3 shows an exemplary computer security application according to some embodiments of the present invention.

FIG. 3 shows a diagram of an exemplary computer security application 30 according to some embodiments of the present invention. Application 30 comprises a plurality of security modules 32a-f, a profile manager 34 connected to security modules 32a-f, and a runtime graphical user interface (GUI) 38 connected to modules 32a-f and to profile manager 34. In some embodiments, each security module 32a-f includes software (e.g. objects, classes, subroutines) configured to perform module-specific program functions (tasks) related to a distinct aspect of computer security. In the example of FIG. 3, security modules include an anti-malware module 32a configured to perform a malware-detection function (e.g. virus scan), a firewall module 32b configured to perform a firewall function (e.g. to block unauthorized access to the respective computer system 10), a network control module 32c configured to perform a network control function (e.g. to allow a user to securely access and/or configure devices on a local network), a parental control module 32d configured to perform a parental control function (to selectively block content, e.g. by restricting a user from accessing certain websites or viewing movies with a certain rating), a backup module 32e configured to perform a data backup and recovery function, and an anti-spam module 32f configured to filter unsolicited communication such as email messages. In some embodiments, each security module 32a-e may comprise or employ module-specific data structures and/or parameters relevant to the program function performed by the respective module. For instance, anti-malware module 32a may include or otherwise employ a list of malware-identifying indicators such as a virus signature database, and a list of malware behavior pattern indicators, among others. Similarly, anti-spam module 32f may include or otherwise use message classification parameters such as a set of neural-network weights, spam-identifying signatures, and/or classifier training data, for example. Such data may be kept up to date by periodic or on-demand software updates, for instance from a remote server connected to computer system 10 via computer networks 12, 14.

Security modules 32a-f receive a set of module configuration parameters 42 from profile manager 34, and forward a set of security report data 44 to GUI 38. In some embodiments, module configuration parameters 42 comprise a set of module-specific parameters specifying particular operating conditions of modules 32a-f. Exemplary configuration parameters include an on/off indicator specifying whether a particular module (e.g. parental control, firewall, backup) is active or not or is to be displayed in a given area of GUI 38, an indicator specifying an action to be taken upon detecting a malware infection (e.g. alert, disinfect, quarantine), an indicator specifying a level of aggressiveness of the anti-spam or anti-malware modules, an indicator specifying a frequency of anti-malware scans or backups, a blacklist and/or whitelist of email addresses, and a list of data items for backup, among others. Module configuration parameters 42 are determined by profile manager 34 according to configuration profiles and/or user profiles, in response to user input as described in detail below.

In some embodiments, security report data 44 comprise a set of data produced by security modules 32a-f upon execution of respective computer security tasks. Security report data 44 are fed to GUI 38 for display to the user, as shown below. Exemplary report data 44 include an indicator of a security-related system event (e.g. detection of a virus, activation of the firewall, start of a backup process, etc.). Other report data 44 may include an indicator of malware status (e.g. clean/malicious), an identifier (e.g. name, pointer to an item in a list of malware, etc.) of a malware agent infecting computer system 10, and an indicator (e.g. filename) of an object currently being scanned for malware. Other exemplary data 44 may include a count of objects scanned for malware, a count of files transferred over the local network, and an estimate of a time remaining till the conclusion of a current malware scan, among others.

In some embodiments, profile manager 34 comprises code that configures various aspects of security application 30 according to a user's profile. As detailed below, upon installation of application 30, profile manager 34 displays a questionnaire to the user. According to the user's answers to the questionnaire, profile manager 34 matches the user to one of a predetermined set of user profiles, and determines the configuration parameters of security modules 32a-f and the appearance of GUI 38 according to the selected user profile. In some embodiments, application 30 enables the user to add or change certain aspects of the configuration at a later time.

In some embodiments, profile manager 34 includes a profile database 40 comprising a set of user profile data and a set of configuration profile data. In some embodiments, a user profile represents a group of users identified through a set of common characteristics such as a manner of using the computer (e.g. most frequently used computer programs) and common preferences for parental control and spam control, among others. Exemplary user profiles include:

a) Typical. A user who owns and uses the PC for personal purposes, for small business or school related activities. The most frequent activities are: web browsing, e-mail, reading news, writing documents, online transactions, viewing pictures, watching movies.

b) Gamer. A user that specifically purchased a PC and Internet services for gaming purposes. She uses this device mostly for her hobbies and at home. In the majority of the cases this user owns a last generation desktop PC with and a broadband connection. The most frequent activities are gaming, Internet and news. For this user computer performance and bandwidth availability are the top concerns.

c) Parent. A regular household owner who owns several computers, one for almost each family member, and sometimes a printer and game consoles. The members of the family might fall in one of the user types mentioned above, but they share the same budget and usually only not all the members are computer savvy. For this user, controlling the access to the internet and to specific applications for his children is a top concern d) Custom. A user who wishes to configure in detail product settings.

Other exemplary user profiles may be defined according to a computer competence indicator, as follows:

e) Novice (Beginner). A user who has basic computer knowledge and who frequently needs the help of a more computer savvy person to configure the computer and the security software installed on it. This user is interested in keeping the default configuration and using only the most important product functions when needed.

f) Intermediate (Average). A user who has intermediate computer skills and who wants to have access to the most important product settings and to be informed of the detailed security status. This user does not necessarily need access advance configuration for all features, but uses most of the product features.

g) Expert (Advanced). A user who has advanced computer knowledge and who wants to be able to configure in detail each product feature and to have access to advanced reports.

In some embodiments, novice, intermediate, and expert may indicate the user's declared or self-evaluated level of computer proficiency. Such a computer proficiency may be an indicator of proficiency with computers in general, with computer security, or with security application 30. It will be clear to one skilled in the art that the above user profile names may be altered in many ways without departing from substance of the teachings above. For example, alternative names for Novice include Beginner, Basic, or any other name indicating a substantially low computer competence level. Similarly, an application may use names like Average and Advanced instead of Intermediate and Expert, respectively.

User profiles may also be defined according to computer hardware considerations, such as whether computer system 10 running application 30 is a desktop or a laptop computer, the amount of available memory, or whether system 10 is connected to a network or not. In some embodiments, user profile categories described above are not mutually exclusive. For instance, a user may be a Novice Parent or an Expert Gamer on a Laptop. In some embodiments, profile database 40 stores user profiles as vectors of values or as sets of property/value pairs, or as database tables. An exemplary user profile scheme is illustrated in FIG. 4.

In some embodiments, profile manager 34 determines configuration parameters by matching the user profile of the user to one of a set of predetermined configuration profiles stored in profile database 40. In some embodiments, a configuration profile comprises a data structure specifying a set of values of configuration parameters of application 30, the set of values corresponding to a user profile or a combination of user profiles (such as Expert Gamer on a Laptop). Configuration profiles effectively map user profiles into user-specific configurations of application 30. Configuration parameters set by configuration profiles include module configuration parameters 42 customizing the operation of security modules 32, as well as a set of GUI parameters 46 customizing the appearance and contents of GUI 38. Table 1 illustrates an exemplary correspondence between user profiles and configuration profiles.

TABLE 1

| User profile | Configuration profile |
| --- | --- |
| Typical | Game mode is OFF (Module configuration parameters) Parental Control is OFF (Module configuration parameters) Adds Backup buttons to Novice and Intermediate Dashboard (GUI parameters) |
| Gamer | Parental Control is OFF (Module configuration parameters) Firewall is OFF (Module configuration parameters) Scheduled malware scan is OFF (Module configuration parameters) Adds Game Mode button to Novice and Intermediate Dashboard (GUI parameters) |
| Parent | Game mode is OFF (Module configuration parameters) Parental Control is ON (Module configuration parameters) Adds Parental Control button to Novice and Intermediate Dashboard (GUI parameters) |
| Custom | Configurable |
| Novice | Novice dashboard is ON (GUI parameters) Pop-ups are OFF (GUI parameters) Activity Zone is OFF Active Virus Control mode: DISINFECT (Module parameters, GUI parameters) |
| Intermediate | Intermediate dashboard is ON (GUI parameters) Pop-ups are OFF (GUI parameters) Activity Zone is OFF Active Virus Control mode: QUARANTINE (Module parameters, GUI parameters) |
| Expert | Expert dashboard is ON (GUI parameters) Pop-ups are ON (GUI parameters) Activity Zone is ON Active Virus Control mode: ASK (Module parameters, GUI parameters) Show anti-spam wizard (GUI parameters) Show scan activity bar (GUI parameters) |
| Laptop | Backup is OFF (Module parameters) |
| Network | Firewall is ON (Module parameters) Network Control is ON (Module parameters) |

FIG. 5 shows a diagram of an exemplary network of relations between configuration profiles, security modules 32a-f, and GUI 38 according to some embodiments of the present invention. For instance, laptop mode settings (indicating whether system 10 is a laptop) influence settings of backup module 32c, by e.g. turning it off. Similarly, gamer mode settings (indicating whether the user is in the gamer user profile) affect settings of anti-malware module 32a and firewall module 32b.

In some embodiments, GUI 38 is a software component of application 30, configured to display to the user security report data 44 received from modules 32a-f (e.g. the status of various modules, malware scan statistics, etc.). In some embodiments, a set of GUI parameters 46 received from profile manager 34 comprises a set of indicators specifying how report data 44 is displayed. For each item of report data 44, GUI parameters 46 may include an indicator of visibility (e.g. show/hide) of the respective item, an indicator of whether an item is displayed as an image (icon, graph) or as text, indicators of the level of detail of the information displayed, and other indicators of the visual appearance of the respective item: font, size, colors, icons, etc. Other exemplary GUI parameters 46 include contents of auxiliary text fields such as hints, explanations, or help entries, and indicators of GUI window properties: size, colors, and contents of menus, among others. GUI parameters 46 may also include indicators of a type and position of user interaction elements (e.g. tabs, buttons, checkboxes, fill-in forms, drop-down lists, etc.).

In some embodiments, GUI parameters 46 are set according to predetermined configuration profiles, as discussed above. For instance, the visual appearance of GUI 38 may vary according to a user profile of the user: a Novice GUI is displayed to Novice users, while Intermediate and Expert GUIs are displayed to Intermediate and Expert users, respectively. Several examples of such customized GUIs are given in FIGS. 11-A-C and 12-A-B and discussed further below. Table 2 shows an exemplary set of system events (received via security report data 44) and how they are displayed in GUI 38 depending on the user profile of the user.

TABLE 2

| System event | Novice GUI | Intermediate GUI | Expert GUI |
|---|---|---|---|
| Virus detected | Novice-specific content | Intermediate-specific content | Expert-specific content |
| Scanning incoming/outgoing email | not displayed | not displayed | Expert-specific content |
| Quarantine folder is full | not displayed | not displayed | Expert-specific content |
| Attempt to download an infected file | Novice-specific content | Intermediate-specific content | Expert-specific content |
| A potentially malicious application has been detected and closed | Novice-specific content | Intermediate-specific content | Expert-specific content |
| New version of an application is allowed to access the Internet | Not displayed | Not displayed | Expert-specific content |
| New Application is allowed to access the Internet (new Firewall rule added) | Not displayed | Not displayed | Expert-specific content |
| An unrecognized application is trying to connect to the Internet | Novice-specific content | Intermediate-specific content | Expert-specific content |
| Port Scan Blocked | Not displayed | Not displayed | Expert-specific content |

In some embodiments, GUI 38 may allow a user to alter some configuration parameters of GUI 38 (e.g. what gets displayed) and/or security modules 32a-f (e.g. turn a module on or off) at a time following the initial setup of application 30, for instance by clicking on a Settings button and filling in a form, or selecting new configuration options from a drop-down list. As a result of receiving a user input 50b indicating a configuration change, GUI 38 may formulate a set of updated configuration parameters 48 including the new values for configuration parameters. Updated configuration parameters 48 are then forwarded to profile manager 34.

In some embodiments, profile manager 34 may employ a setup GUI 36 to perform an initial configuration of security application 30 upon installation or during the first use of application 30. In some embodiments, setup GUI 36 comprises a software module programmed to display to the user a setup questionnaire and to receive from the user an indicator of a response, or a choice of configuration options.

Figure 6:
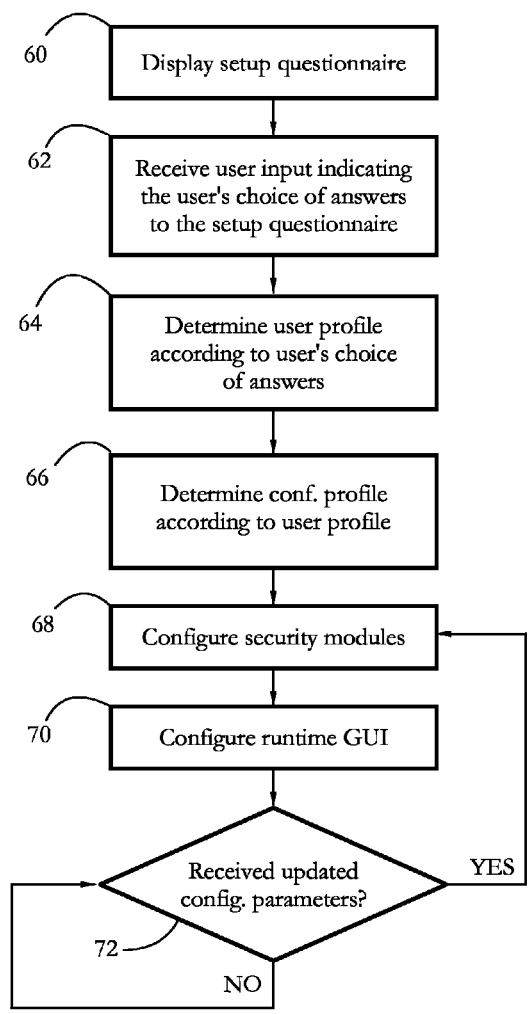
FIG. 6 illustrates an exemplary sequence of steps performed by the profile manager of FIG. 3 according to some embodiments of the present invention.

FIG. 6 shows an exemplary sequence of steps performed by profile manager 34 to conduct the initial configuration of security application 30, according to some embodiments of the present invention. In a step 60, setup GUI 36 displays a setup questionnaire to the user. In some embodiments of setup questionnaire, the user may be asked to indicate a choice of configuration parameters, or to identify him/herself in a list of user profiles. In some embodiments, the setup questionnaire comprises a set of questions or statements, which may or may not have a direct relation to configuration options of application 30, but which may be used by profile manager 34 to infer information such as the user profile of the user. Such questions/statements may be displayed simultaneously or in a succession of windows/tabs. Setup questionnaires may include text, images, and/or icons. For each item in the setup questionnaire, setup GUI 36 may provide the user with a means to indicate an answer, choice, and/or option (e.g. by mouse-clicking on a button, checkbox, or other clickable area of GUI 36, by filling in a form, etc.). Several examples of such questionnaires are discussed below. In a step 62, setup GUI 36 receives user input 50a indicating the user's choice of configuration options or answers to the setup questionnaire. In an embodiment in which the setup questionnaire comprises a succession of several questions, steps 60-62 may be repeated for each question.

In a step 64, profile manager 34 determines a user profile of the user according to the input received in step 62, and possibly according to additional information. Some examples of decision process involved in determining the user profile are discussed below in relation to FIGS. 8 and 10. Next, in a step 66, profile manager 34 retrieves a configuration profile corresponding to the identified user profile from profile database 40. In a step 68, profile manager 34 formulates module configuration parameters 42 according to the configuration profile (and possibly additional information such as updated configuration parameters 48 received from GUI 38), and forwards parameters 42 to security modules 32a-f. In a step 70, profile manager 34 formulates GUI parameters 46, and forwards parameters 46 to GUI 38. A step 72 determines whether profile manager 34 has received updated configuration parameters 48 from GUI 38. If yes (indicating that the user is making configuration changes via GUI 38), profile manager 34 proceeds back to step 68.

FIG. 7-A shows an exemplary setup GUI window 80a displaying a first part of a setup questionnaire according to some embodiments of the present invention. This first part of the setup questionnaire instructs the user to select one of two options: easy install or custom install. Each option is represented as an option field 82 comprising a visual identifier (icon) 84 and a user interaction element 86 (a clickable button in this example). Profile manager 34 registers a mouse click on element 86 as an indicator that the user has selected the respective option.

FIG. 7-B shows an exemplary setup GUI window 80b displaying a second part of a setup questionnaire according to some embodiments of the present invention. This second part comprises a set of multiple-choice questions 88, all displayed simultaneously in window 80b. In some embodiments, questions 88 comprise a look-and-feel question, a decision-making question, and a security maintenance question. Each question 88 displays a set of answers 90, allowing the user to select a preferred answer by clicking radio button 92 corresponding to the respective answer. In some embodiments, setup GUI 36 may display a set of questions with a suggested answer already filled in (as is the case of radio button 94 in FIG. 7-B). In such embodiments, the user may select the suggested answers e.g. by clicking a Next button, or may select other answers via radio buttons 92.

FIG. 7-C shows an exemplary set GUI window 80c displaying a view selection questionnaire requesting a user to select one of a novice (basic), intermediate (medium), and expert (advanced) GUI configuration, according to some embodiments of the present invention. A user employs a graphical user interaction element (e.g. a clickable button) to select one of the GUI configurations.

FIG. 7-D shows another exemplary set GUI window displaying a view selection questionnaire requesting a user to select one of a novice (basic), intermediate (medium), and expert (advanced) GUI configuration, according to some embodiments of the present invention. In the configuration of FIG. 7-D, each GUI configuration is previewed graphically when preliminarily selected by a user, for example by hovering a cursor over a corresponding configuration icon.

Figure 8:
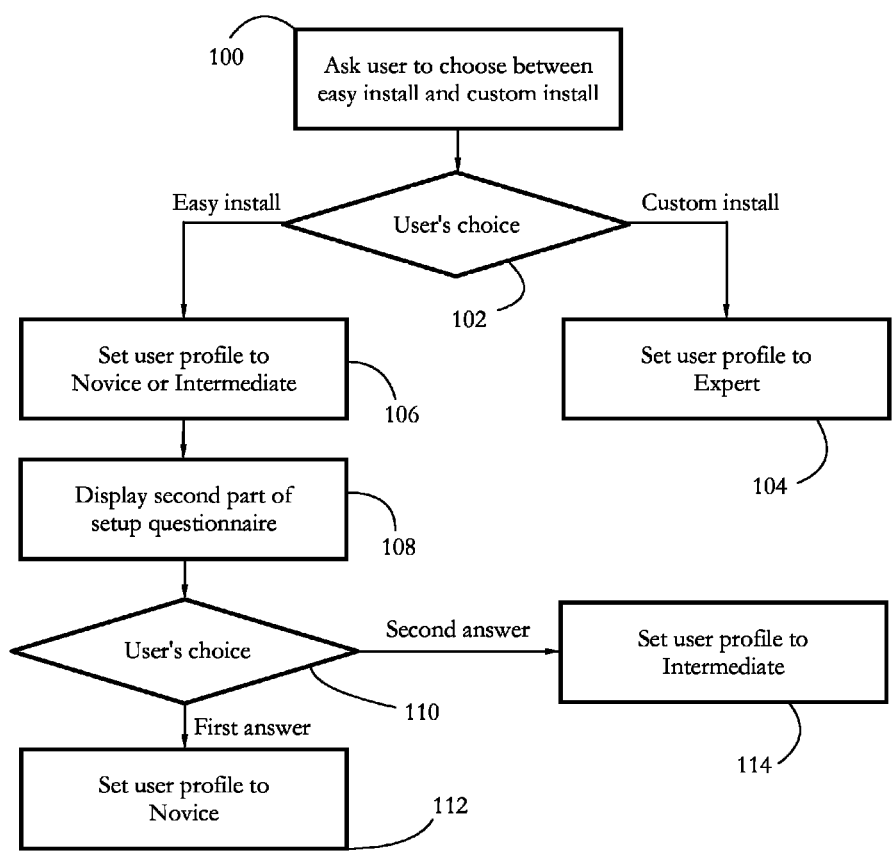
FIG. 8 illustrates an exemplary sequence of steps performed by the profile manager for processing a multi-part setup questionnaire, according to some embodiments of the present invention.

FIG. 8 shows an exemplary sequence of steps performed by profile manager 34 to determine a user profile of the user according to the user's answers to a setup questionnaire of the kind shown in FIGS. 7-A-B. In a step 100, setup GUI 36 displays a first part of the setup questionnaire, asking a user to choose between "Easy install" and "Custom install" (FIG. 7-A). A step 102 determines the user's choice of answer. If the user has selected "Custom install", profile manager 34 proceeds to a step 104, which sets the user profile of the user to "Expert". If the user has selected "Easy install", in a step 106, the user profile of the user is set to "Novice OR Intermediate".

Next, in a step 108, profile manager 34 instructs GUI 36 to display a second part of the setup questionnaire (see FIG. 7-B, or FIGS. 7-C-D). A step 110 determines the user's choice of answer to the second part of the setup questionnaire. If the user has selected the first answer to all displayed questions, in a step 112, profile manager 34 sets the user profile of the user to "Novice". If the user has selected the second answer to at least one of the questions, a step 114 sets the user profile to "Intermediate". The decision process presented in FIG. 8 is purely for illustration purposes and does not limit the scope of the invention. More complicated decision processes and/or user profile assignments may be devised in a similar way. For example, in an embodiment in which GUI 36 displays a questionnaire with suggested answers already filled in, profile manager 34 may designate as "Novice" a user that accepts the default answers, and as "Intermediate" a user that selects answers other that the suggested ones. In another example, profile manager 34 may designate as "Expert" a user that selects the first answer to a first question, and either one of answers 2, 3, and 5 to a second question, etc. Alternatively, an explicit user choice may be employed, as illustrated in FIGS. 7-C-D.

FIG. 9-A shows an exemplary setup GUI window 80e including a security application tool configuration questionnaire according to some embodiments of the present invention. In this example, the user is asked to configure a "My Tools" area of the user interface by selecting one or more features to create shortcuts to. Exemplary features illustrated in FIG. 9-A include Laptop Mode, Game Mode, Parental Controls, and Home Network Management.

FIG. 9-B shows an exemplary setup GUI window 80f including a home network management questionnaire according to some embodiments of the present invention. A user employs a set of checkboxes 120 to configure the computer as a security application server for local area network, as a security application client under the control over a different PC (server) on the network, or to skip this step during the product installation process.

FIG. 9-C shows an exemplary setup GUI window 80g including a parental control setup questionnaire according to some embodiments of the present invention. A user employs as set of checkboxes 122 to select setting up parental controls for separate operating system (e.g. Windows) user accounts, or for the present operating system user account, or to skip this step FIG. 10-A shows an exemplary sequence of steps performed by profile manager 34 to determine configuration profiles in an embodiment employing setup questionnaires described above, according to some embodiments of the present invention. In steps 130-132, GUI 36 displays to the user a tool shortcut configuration questionnaire (e.g. FIG. 9-A) and receives user input indicating one or more tool shortcut selections. Next, in steps 138-140, setup GUI 36 displays a user competence questionnaire (e.g. FIG. 7-C or 7-D), and receives user input indicating a self-evaluated competence indicator of the user (e.g. Novice) and/or indicator of desired view complexity (e.g. Basic View). A step 142 determines whether a user selected one or more tool shortcuts in step 132. If no, in a step 152, profile manager 34 computes the configuration profile of the user according to the user profile determined so far. If yes, and in particular if a parental control tool shortcut was previously selected, in steps 144-146, GUI 36 displays a parental control questionnaire (e.g. FIG. 9-C) and receives user input indicating a set of parental control options. If a home network management tool shortcut was previously selected by the user, in a step 148, GUI 36 displays a network configuration questionnaire. A step 150 receives user input indicating user-preferred network configuration options. In step 152, profile manager 34 determines the configuration profile of the user according to the user profile data identified in steps 130-150.

FIG. 10-B shows another exemplary sequence of steps performed by profile manager 34 to determine configuration profiles in an embodiment employing setup questionnaires described above, according to some embodiments of the present invention. In a step 230, GUI 36 displays a user display profile questionnaire (see. e.g. FIG. 7-D) and receives responsive user input. In a step 232, GUI 36 displays a tool shortcut configuration questionnaire (FIG. 9-A), and receives responsive user input. In a step 234, GUI 36 displays a parental control questionnaire (FIG. 9-C), and receives responsive user input. In a step 236, GUI 36 displays a network configuration questionnaire (FIG. 9-B), and receives responsive user input. In a step 238, GUI 36 displays a setting configuration screen listing the user-selected profile settings configured so far, and receives user input confirming the settings. In a step 240, a configuration profile is determined according to the user-selected settings.

FIG. 11-A shows an exemplary GUI window 160a of security application 30 for a user of the Novice (Basic View) user profile according to some embodiments of the present invention. Window 160a includes a security status area 162, a set of menu items 164, a Settings (Options) button 166, and other visual elements such as a search bar 178.

Security status area 162 displays a current security assessment of system 10, in the form of a single indicator (e.g. a number, or a qualitative indicator such as high/moderate/low), or to varying levels of detail, as shown below. In some embodiments, security application 30 may compute a unified security assessment indicator by combine report data 44 from a subset of security modules 32a-f. Area 162 may include an icon 172 and/or a security status message 174. In some embodiments, area 162 may include a set of security alerts. In some embodiments, security alerts are generated by the occurrence of certain system events related to computer security, e.g. detection of a malicious file, an attempt by an unknown application to access the Internet, an attempt to download a malicious file, etc. In some embodiments, security alerts are event-specific and/or security module-specific (generated by specific security modules 32a-f). Visual elements of icon 172 and/or message 174 (e.g. color, font size) may vary according to the security assessment. For instance, a red icon may indicate a security alert (e.g. a malware infection), whereas a green icon may indicate a normal operation. In some embodiments, security status area 162 may also include a button 176 allowing a user to perform a security action (e.g. to turn on the firewall or delete all detected malicious files) according to the current security assessment of system 10.

In some embodiments, Settings button 166 of window 160a allows the user to set configuration options/parameters of various components of security application 30. When the user clicks button 166, GUI 38 may display a configuration questionnaire and/or a list of available options to the user, and may receive user input 50b indicating the user's choice of configuration options/parameters. Subsequently, GUI 38 may forward the new settings to profile manager 34 in the form of updated configuration parameters 48.

In some embodiments, each menu item 164 may include an item-specific visual identifier (icon) 168 and a user interaction element (e.g. button) 170. Clicking on button 170 allows the user to perform a set of tasks associated with the respective menu item. For example, clicking the "Security" button in FIG. 11-A may open an interface to the anti-malware and firewall modules, or may launch a malware scan of computer system 10, among others. In some embodiments, menu items 164 displayed in Novice GUI window 160a are individually customizable.

FIG. 11-B shows an exemplary GUI window 160b of security application 30 for a user of the Intermediate (Intermediate View) user profile according to some embodiments of the present invention. Intermediate GUI window 160b comprises a set of tabs 180, each representing an aspect and/or set of tasks of application 30. In some embodiments, tabs 180 include a Dashboard tab comprising a security status area 262, a set of menu items and other visual elements such as security tips, among others. The dashboard provides detailed status and links to tasks for all functional areas of the product. Other tabs include security, tune-up, file manager, and network tabs. The security tab provides detailed status and links to tasks for the security functional areas such as antivirus, antispam, antiphising and parental controls, among others. The tune-up tab provides detailed status and links for tune-up functions such as registry cleaner, duplicate finder, and PC cleanup. The file manager (file storage) tab provides detailed status and links for file management/storage functions such as file encryption and backup. The network tab provides detailed status and links for home network management functions.

In some embodiments, the granularity (level of detail) of the security information displayed within area 262 is substantially finer than the granularity of data shown in area 162 of Novice GUI window 160a (FIG. 11-A): status area 262 displays a plurality of indicators of various aspects of computer security, as well as a plurality of security alerts, instead of the unified security assessment indicator/security alert displayed by Novice GUI window 160a. The name and scope of menu items displayed by Intermediate GUI window 262 may differ from those displayed by Novice GUI window 162. For instance, a feature creation item ("Add new") 182 allows a user to customize the appearance of window 160b by creating additional menu items.

FIG. 11-C shows an exemplary GUI window 160c of security application 30 for a user of the Expert (Advanced View) user profile according to some embodiments of the present invention. Expert GUI window 160c includes a plurality of first-level tabs 280 comprising a Dashboard tab. In some embodiments, the Dashboard tab comprises a plurality of second-level tabs 380, each corresponding to a distinct aspect of computer security. For example, each second level tab 380 may correspond to a distinct security module 32a-f. In some embodiments, each second-level tab 380 may display a security status area 362 comprising a plurality of data items 184 such as statistics, event-specific alerts and graphs. Through tabs 280 and 380, Expert GUI window 160c displays information with substantially finer granularity than Novice and Intermediate GUI windows 160a and 160b, respectively. In some embodiments, a user of the Expert user profile may therefore visualize information about virtually all aspects of security application 30, to any desired level of detail.

FIG. 12-A shows an exemplary GUI window 190a displaying an on-demand malware scan interface. In some embodiments, such an interface is launched when the user requests a system-wide malware scan, e.g. by activating the "Scan now" menu item displayed in the Intermediate GUI window 160b (FIG. 11-B). In the example in FIG. 12-A, GUI window 190a is configured for a user of the Novice or Intermediate user profiles. GUI window 190a includes a scan progress indicator 192 and a low granularity security status indicator 194 (a single line text message, in this example). In some embodiments, GUI window 190a may also include a granularity control item ("Show More") 196 allowing the user to increase the level of detail displayed by GUI window 190a.

FIG. 12-B shows an exemplary GUI window 190b of the on-demand malware scan interface, configured for a user of the Expert user profile. In some embodiments, GUI window 190b displays scan results with substantially finer granularity than GUI window 190a configured for the Novice/Intermediate user, including statistical data 198, a graph 284, and a hyperlink 196 to a malware knowledgebase.

It will be clear to one skilled in the art that the above embodiments may be altered in many ways without departing from the scope of the invention. Accordingly, the scope of the invention should be determined by the following claims and their legal equivalents.

What is claimed is:

1. A computer-implemented method comprising employing a computer system including at least one processor to perform:
   an anti-malware application customization sequence comprising:
      displaying to a user a desired graphical user interface (GUI) content complexity questionnaire, the desired GUI content complexity questionnaire inviting the user to select a desired anti-malware application GUI content display complexity from a plurality of content complexity levels, the complexity levels including a low complexity, an intermediate complexity, and a high complexity level;
      in response to displaying the desired GUI complexity questionnaire, receiving a user input indicative of the desired anti-malware application GUI display complexity;
      displaying to the user a desired anti-malware user involvement questionnaire associated with at least one of decision making and security management, the desired anti-malware user involvement questionnaire inviting the user to select a desired level of user involvement in configuring non-GUI settings of the anti-malware application; and
      in response to displaying the desired anti-malware user involvement questionnaire, receiving a user input indicative of the selected desired level of user involvement in configuring non-GUI settings of the anti-malware application;
   a display of an anti-malware application graphical user interface (GUI) configured according to the user input indicative of the desired anti-malware application graphical user interface display complexity, wherein
      for the low complexity level, the GUI generates an application home display comprising a plurality of common user task control items, each common user task control item being configured to receive a user input initiating a common anti-malware application task; and for at least one level selected from the intermediate complexity and high complexity levels, the GUI generates an application home display including a plurality of functional area indicators, each functional area indicator being configured to receive a user input initiating a display of a dashboard for a corresponding functional area of the anti-malware application; and a non-GUI anti-malware function configured according to the selected desired level of user involvement in configuring non-GUI settings of the anti-malware application.

2. The method of claim 1, wherein the plurality of common user task control items includes a malware scan control button, an update control button, and a fix security issues button.

3. The method of claim 1, wherein the plurality of functional area indicators includes an antivirus tab, an antispam tab, a parental control tab, and a firewall tab.

4. The method of claim 1, wherein the anti-malware application customization sequence forms part of an anti-malware application installation sequence.

5. The method of claim 1, wherein each of the low complexity, intermediate complexity, and high complexity levels define a plurality of individually-user-configurable anti-malware application settings.

6. The method of claim 1, wherein the anti-malware customization sequence comprises employing the selected desired level of user involvement in configuring non-GUI settings of the anti-malware application to select an anti-malware functionality profile from among at least two profile types selected from a group consisting of a typical profile, a gamer profile, and a parent profile.

7. The method of claim 1, wherein the desired graphical user interface content complexity questionnaire invites the user to select a view from a menu including a beginner user view selection, an intermediate user view selection, and an advanced user view selection.

8. The method of claim 1, wherein the desired graphical user interface content complexity questionnaire invites the user to select a view from a menu including a beginner user view selection, an intermediate user view selection, and an advanced user view selection.

9. A non-transitory computer-readable medium encoding instructions which, when executed by a computer system, cause the computer system to perform:

an anti-malware application customization sequence comprising:

displaying to a user a desired graphical user interface (GUI) content complexity questionnaire, the desired GUI content complexity questionnaire inviting the user to select a desired anti-malware application GUI content display complexity from a plurality of content complexity levels, the complexity levels including a low complexity, an intermediate complexity, and a high complexity level;

in response to displaying the desired GUI complexity questionnaire, receiving a user input indicative of the desired anti-malware application GUI display complexity;

displaying to the user a desired anti-malware user involvement questionnaire associated with at least one of decision making and security management, the desired anti-malware user involvement questionnaire inviting the user to select a desired level of user involvement in configuring non-GUI settings of the anti-malware application; and in response to displaying the desired anti-malware user involvement questionnaire, receiving a user input indicative of the selected desired level of user involvement in configuring non-GUI settings of the anti-malware application;

a display of an anti-malware application graphical user interface (GUI) configured according to the user input indicative of the desired anti-malware application graphical user interface display complexity, wherein for the low complexity level, the GUI generates an application home display comprising a plurality of common user task control items, each common user task control item being configured to receive a user input initiating a common anti-malware application task; and for at least one level selected from the intermediate complexity and high complexity levels, the GUI generates an application home display including a plurality of functional area indicators, each functional area indicator being configured to receive a user input initiating a display of a dashboard for a corresponding functional area of the anti-malware application; and a non-GUI anti-malware function configured according to the selected desired level of user involvement in configuring non-GUI settings of the anti-malware application.

10. The non-transitory computer-readable medium of claim 9, wherein the plurality of common user task control items includes a malware scan control button, an update control button, and a fix security issues button.

11. The non-transitory computer-readable medium of claim 9, wherein the plurality of functional area indicators includes an antivirus tab, an antispam tab, a parental control tab, and a firewall tab.

12. The non-transitory computer-readable medium of claim 9, wherein the anti-malware application customization sequence forms part of an anti-malware application installation sequence.

13. The non-transitory computer-readable medium of claim 9, wherein each of the low complexity, intermediate complexity, and high complexity levels define a plurality of individually-user-configurable anti-malware application settings.

14. The non-transitory computer-readable medium of claim 9, wherein the anti-malware customization sequence comprises employing the selected desired level of user involvement in configuring non-GUI settings of the anti-malware application to select an anti-malware functionality profile from among at least two profile types selected from a group consisting of a typical profile, a gamer profile, and a parent profile.

15. The non-transitory computer-readable medium of claim 9, wherein the desired graphical user interface content complexity questionnaire invites the user to select a view from a menu including a beginner user view selection, an intermediate user view selection, and an advanced user view selection.

16. A computer-implemented system including at least one processor configured to form:

means for performing an anti-malware application customization sequence by:

displaying to a user a desired graphical user interface (GUI) content complexity questionnaire, the desired GUI content complexity questionnaire inviting the user to select a desired anti-malware application GUI content display complexity from a plurality of content complexity levels, the complexity levels including a low complexity, an intermediate complexity, and a high complexity level;

in response to displaying the desired GUI complexity questionnaire, receiving a user input indicative of the desired anti-malware application GUI display complexity;

displaying to the user a desired anti-malware user involvement questionnaire associated with at least one of decision making and security management, the desired anti-malware user involvement questionnaire inviting the user to select a desired level of user involvement in configuring non-GUI settings of the anti-malware application; and in response to displaying the desired anti-malware user involvement questionnaire, receiving a user input indicative of the selected desired level of user involvement in configuring non-GUI settings of the anti-malware application;

means for displaying an anti-malware application graphical user interface (GUI) configured according to the user input indicative of the desired anti-malware application graphical user interface display complexity, wherein for the low complexity level, the GUI generates an application home display comprising a plurality of common user task control items, each common user task control item being configured to receive a user input initiating a common anti-malware application task; and for at least one level selected from the intermediate complexity and high complexity levels, the GUI generates an application home display including a plurality of functional area indicators, each functional area indicator being configured to receive a user input initiating a display of a dashboard for a corresponding functional area of the anti-malware application; and means for performing a non-GUI anti-malware function configured according to the selected desired level of user involvement in configuring non-GUI settings of the anti-malware application.

\* \* \* \* \*